Oct. 12, 1943.　　　　D. H. ANNIN　　　　2,331,291
FLUID FLOW CONTROL DEVICE
Filed Nov. 4, 1942　　　　3 Sheets-Sheet 1
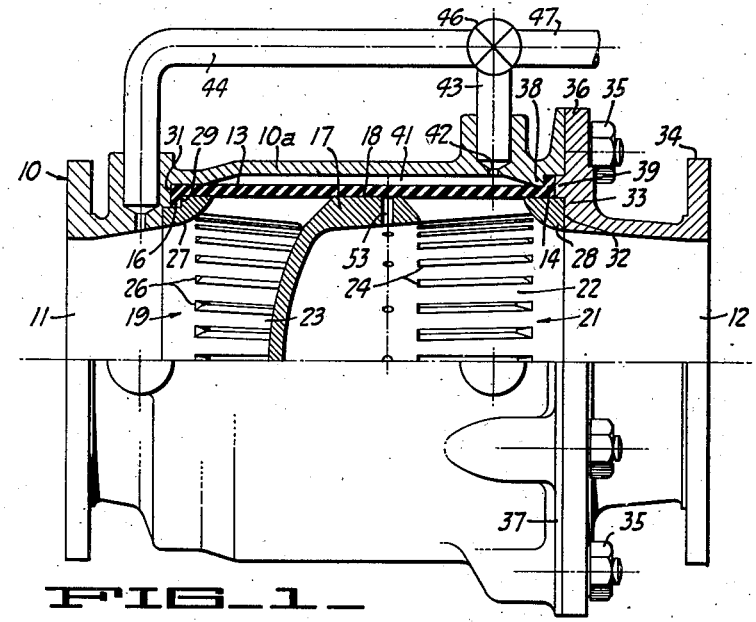
FIG_1_
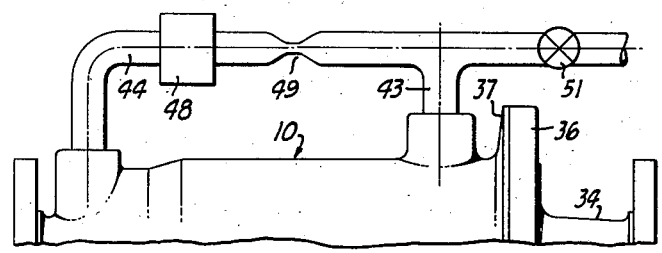
FIG_2_
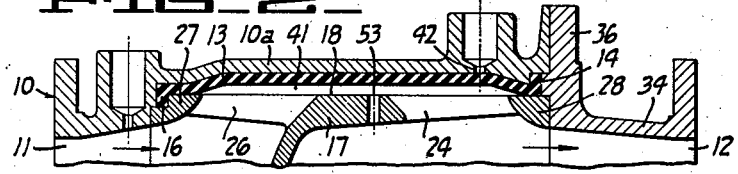
FIG_3_
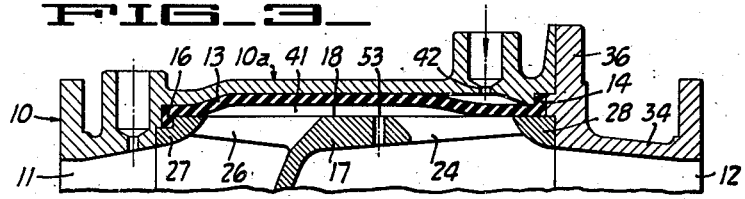
FIG_4_
INVENTOR.
Douglas H. Annin
BY
　　Paul D. Flehr
ATTORNEY Oct. 12, 1943.            D. H. ANNIN            2,331,291
FLUID FLOW CONTROL DEVICE
Filed Nov. 4, 1942            3 Sheets-Sheet 2
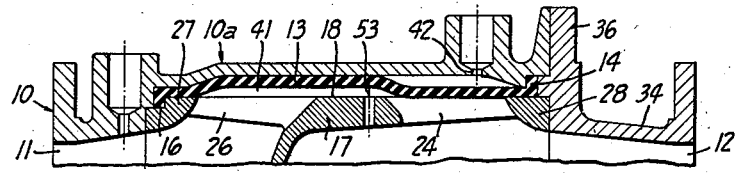
FIG_5_
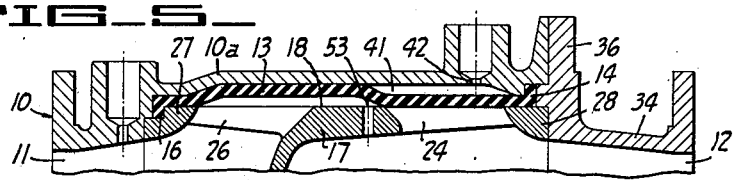
FIG_6_
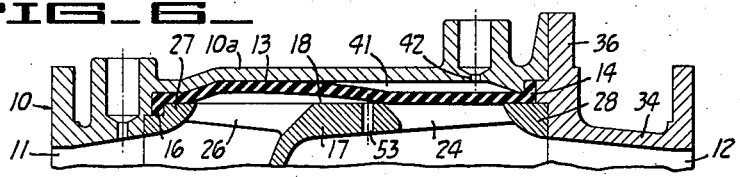
FIG_7_
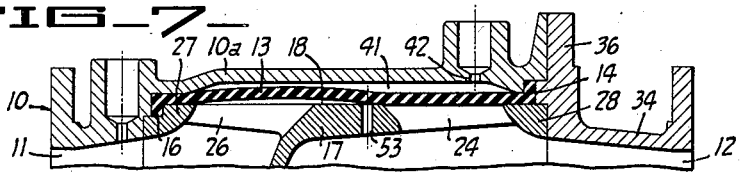
FIG_8_
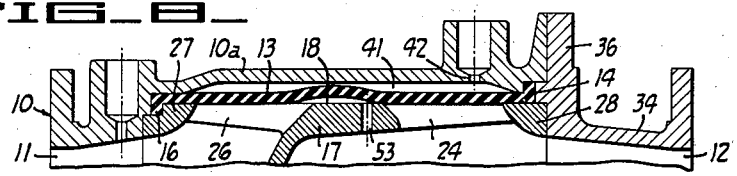
FIG_9_
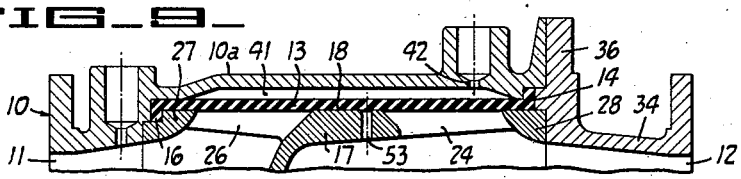
FIG_10_
INVENTOR.
Douglas H. Annin
BY
ATTORNEY Oct. 12, 1943.   D. H. ANNIN   2,331,291
FLUID FLOW CONTROL DEVICE
Filed Nov. 4, 1942   3 Sheets-Sheet 3
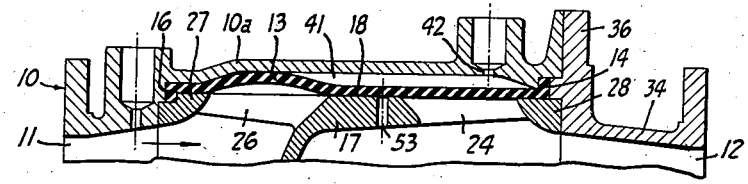
FIG_11_
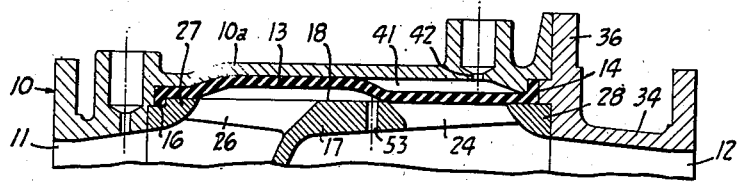
FIG_12_
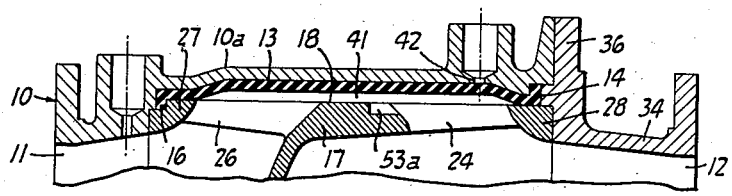
FIG_13_
INVENTOR.
Douglas H. Annin
BY Paul D. Flehr
ATTORNEY Patented Oct. 12, 1943

2,331,291

UNITED STATES PATENT OFFICE 2,331,291

FLUID FLOW CONTROL DEVICE

Douglas H. Annin, Oakland, Calif., assignor to Fluid Control Engineering Co., a copartnership consisting of Marvin H. Grove and Julia E. Grove, both of Piedmont, Calif.

Application November 4, 1942, Serial No. 464,496

5 Claims. (Cl. 137—139)

This invention relates generally to valves or like devices for controlling the flow of various fluids.

It is an object of the invention to improve upon the expansible tube type of valve or flow control device disclosed in co-pending application Ser. No. 460,091, filed Sept. 29, 1942, particularly with respect to eliminating or largely minimizing chattering during opening and closing operations at relatively low inflow pressures.

Further objects of the invention will appear from the following description in which the preferred embodiment has been set forth in detail in conjunction with the accompanying drawings.

Referring to the drawings:

Figure 1 is a side elevational view, in quarter-section, showing a valve incorporating the present invention.

Figure 2 is a view like Figure 1, but showing a different type of control arrangement for the valve.

Figures 3 to 12, inclusive, are cross-sectional details, showing various positions assumed by the expansible tube in effecting closing and opening operations.

Figure 13 is a cross-sectional detail showing another embodiment of the invention.

The valve disclosed in co-pending application Serial No. 460,091 makes use of a body having inflow and outflow passages, with a tube of resilient rubber or like material disposed within the body and having its ends sealed with respect to the body about the passages. A circularly contoured barrier is disposed within the tube intermediate the ends of the same, and this barrier has a peripheral surface upon which the tube may engage and seal. Slotted grid portions extend from the opposite sides of the barrier and form abutments against inward collapsing of the tube. A fluid chamber is formed about the tube, and by introducing fluid under pressure into this chamber, or by venting fluid from the same, the tube assumes closed or open positions with respect to the barrier.

In one particular embodiment disclosed in said application Serial No. 460,091, the liquid pressure is taken from the inflow side for application to the chamber about the expansible tube. A particular feature of the valve in said co-pending application is the fact that the annular clearance about the barrier for full open position of the expansible tube is proportioned to be from about $\frac{1}{20}$ to $\frac{1}{22}$ the diameter of the barrier. This serves to prevent chattering or fluttering when operating over a wide range of inflow pressures, such as from 30 to 200 lbs. per square inch.

In operating the valve described above it has been found that with inflow pressures substantially below 30 lbs. per square inch, as for example from 10 to 20 lbs. per square inch, a considerable amount of chattering or fluttering is experienced. In commercial installations encountering such low pressures, chattering is undesirable in that it may place strains upon associated piping and equipment and tends to cause undue wear or mechanical disintegration of the rubber tube. The present invention serves either to eliminate such chattering or fluttering or to minimize the same to such an extent that it is no longer harmful or dangerous. In general my improved valve provides certain restricted flow passages in conjunction with the barrier, and which occasion a different type of closing action to eliminate or largely minimize unstable conditions causing chattering.

Referring to Figure 1 of the drawings, the device illustrated consists of a body 10, which is formed to provide fluid passages 11 and 12. It is assumed that the passage 11 is connected by piping to a source of liquid under pressure, such as a centrifugal pump or gravity pressure tank, while outlet 12 discharges to the atmosphere or is connected by piping to a low pressure system. Within the body there is an expansible tube 13 formed of relatively resilient material such as soft vulcanized rubber, or equivalent synthetic material like "Buna Hycar." The tube is preferably cylindrical and has integral outturned and inturned flanges 14 and 16 respectively.

Within the tube 13 there is a barrier 17 which is circularly contoured, and which has a peripheral surface 18 that is relatively smooth and adapted to effect a seal with respect to the adjacent portion of the expansible tube. To retain barrier 17 in proper position intermediate the ends of tube 13, and to prevent inward collapsing of the tube, the abutment grids 19 and 21 are provided. These grids can be conveniently made integral with the barrier 17, and as illustrated they are formed of circumferentially spaced ribs 22 and 23, whereby fluid may flow through the slots 24 and 26 between these ribs. The end portions of the grids include the annular ring portions 27 and 28. Ring portion 27 provides an annular face 29 opposed to the annular shoulder 31 formed on the body, whereby the flange 16 can be squeezed between these faces to provide the desired seal. Ring portion 28 has its end face 32 engaged by a shoulder 33 formed on the separate body part 34. Body part 34 is clamped to the main body by suitable means such as bolts 35 engaging the adjacent flanges 36 and 37. It can be in the form of a flange coupling as illustrated for making connection to outflow piping.

In order to seal flange 14 with respect to the body, it is clamped between an annular shoulder 38 formed on the body, and the annular surface 39 formed on body part 34. It is desirable to form the peripheral surface 18 of barrier 17 to a diameter slightly larger than that of the grids 19 and 21, to facilitate machining.

About the tube 13 the body is formed to provide a closed annular fluid chamber 41. The wall 10a of body 10, which forms the outer wall of chamber 41, is annular in cross-section and has its surface so disposed as to form an abutment to limit expansion of tube 13.

Assuming that the device is to be used to control flow of liquid, such as water, salt water, chemical solutions, oil, or the like, with the inflow pressure being applied to the chamber 41, connections can be made either as shown in Figures 1 or 2. In Figure 1 a pipe 43 connects with the body and is in communication with chamber 41 through the restricted orifice 42. Another pipe 44 connects to the inflow side of the body, and is associated with pipe 43 through the control valve 46. By operating control valve 46, pipes 43 and 44 can either be placed directly in communication, or communication with pipe 44 can be interrupted while pipe 43 is connected to the venting pipe 47.

In the arrangement of Figure 2 pipe 44 is shown provided with a screen 48 and a restricted controlling orifice 49. Beyond orifice 49 the pipes 43 and 44 are connected together, and pipe 43 may be vented to the atmosphere by opening the control valve 51.

With the arrangement of Figure 1 operating the control valve 46 between open and closed positions serves to either apply inflow liquid pressure to the chamber 41, to cause a closing operation, or to vent chamber 41 to cause an opening operation. The same net effect is obtained by the arrangement of Figure 2, except that in this instance a small amount of liquid is continuously bled through the control valve 51 while the main valve remains closed.

In order to eliminate chattering over an operating range such as from 30 to 200 lbs. per square inch, the clearance about the periphery of the barrier, for full open position of the valve, is made relatively small compared to the barrier diameter. For example in actual practice this clearance is from $\frac{1}{20}$ to $\frac{1}{22}$ the diameter of the barrier. Substantially greater clearances can be used, such as $\frac{1}{18}$ the diameter of the barrier, but ratios as great as $\frac{1}{10}$ the diameter of the barrier cause severe pulsations or chattering within the pressure range indicated.

Assuming a clearance proportioned to prevent pulsations within a pressure range of from say 30 to 200 lbs. per square inch, if the inflow pressure should drop to substantially lower values, as for example to from 10 to 20 lbs. per square inch, chattering is again experienced during opening and closing operations.

According to the present invention chattering at the lower inflow pressures is prevented or largely minimized by providing the periphery of the barrier with a plurality of circumferentially spaced openings 53. These openings are proportioned to afford in aggregate a relatively small cross-sectional flow area compared to the total flow area about the barrier when the tube is fully expanded. Also they are located in such a manner as to be intermediate the end edges of the barrier periphery.

With the openings described above it has been found that the valve has a double closing action, in that the expansible tube first closes with respect to flow through the inflow slots 26, and then finally closes with respect to flow through the openings 53. A better understanding of this action can be had by reference to Figures 3 to 12, inclusive. Figure 3 shows the position of the tube 13 when the chamber 41 is vented to the atmosphere, or in other words full open position of the valve. At this time maximum flow occurs through the annular orifice between the tube 13 and the periphery of the barrier. Assume now that liquid at inflow pressure is introduced through the orifice 42, as by operating the control valve 46 in the manner previously described. As this liquid flows into the chamber 41, it initially commences to collapse the tube 13 around the outflow grid, substantially as indicated in Fig. 4. As this collapsing continues there is a progressive reduction in flow through the slots 24 between the ribs 22. Figure 5 shows the tube nearly completely collapsed upon the outflow grid. Finally the tube collapses to a point where it seals upon the adjacent peripheral edge of the barrier, substantially as shown in Figure 6. At this point all flow of liquid through the slots 24 is cut off, but a small amount of flow still continues through the openings 53.

The action of the tube now changes, and with further flow of liquid into the chamber 41, the collapsing action proceeds on the inflow side of the valve substantially as indicated in Figure 7. As the tube on the inflow side of the barrier continues to collapse away from the outer wall 10a, substantially as indicated in Figure 8, it reaches a point substantially in engagement with the ribs 23 as indicated in Figure 9. During progression between Figures 6 and 9 there is substantially no closing off of the openings 53. When the position shown in Figure 9 is reached there is virtually a bulge in the resilient tube entirely about the periphery of the barrier, and to carry out the final closing action the bulge disappears as the tube in the vicinity of the barrier assumes fully collapsed condition. During collapsing of the bulge there is a final cut off of flow through the openings 53. The extent of the bulge depends upon the operating pressures and other operating conditions. Irrespective of the exact sequence between collapsing of the tube against the ribs on the inflow side, the final closing off of flow through openings 53 occurs by a radial contraction of that portion of the tube surrounding the periphery of the barrier (Fig. 10), and this occurs not earlier than and generally after substantially complete collapsing of that portion of the tube on the inflow side of the barrier.

After a closing operation as described above, the venting of liquid from chamber 41 through orifice 42 causes opening of the tube substantially as indicated in Figs. 11 and 12. Initially the inflow end portion of the tube 13 expands substantially as shown in Fig. 11. As further liquid is vented from chamber 41, the tube peels away from the periphery of the barrier to substantially the position shown in Fig. 12, where flow may occur through the openings 53. Expansion of the tube then continues to the outflow side until full open position is reached such as shown in Fig. 3.

With respect to suitable proportioning of the valve, one can be guided by examples as follows:

*Example I.*—For a 2 inch valve good results were obtained with a barrier 3 inches in diameter, having a width at its periphery of 23/32, and with a clearance about the barrier of 3/32 of an inch. The inflow and outflow grids were provided with 20 slots, each 3/32 of an inch wide and 1⅛ inches long. The rubber tube had a wall thickness of ⅛ of an inch. With respect to openings 53 good results were secured by drilling 10 holes each having a diameter of 3/32 of an inch.

*Example II.*—For a 4½ inch valve the barrier was 6¾ inches in diameter, and 1 7/16 inches wide at its periphery. The clearance about the barrier was 1/32 of an inch. The inflow and outflow grids were provided with 32 slots, each having a width of 3/32 of an inch, and a length of 2 11/32 of an inch. The tube had a wall thickness of 3/16 of an inch. Good results were secured by using 16 holes (53), each having a diameter of 0.128 inch.

*Example III.*—For a 6½ inch valve the barrier had a diameter of 9¾ inches, with a width at its periphery of 2⅛ inches. The clearance about the periphery of the barrier was 1/32. The inflow and outflow grids were each provided with 36 slots, each slot being 3/32 wide, and 3 3/32 long. The tube had a wall thickness of ¼ of an inch. With respect to the holes 53, 18 were drilled about the periphery of the barrier with each hole having a diameter of 0.169.

*Example IV.*—For a 10 inch valve the barrier had a diameter of 15 inches, and a width at its periphery of 3 9/32. The clearance about the periphery of the barrier was 1/32 of an inch. The inflow and outflow grids were each provided with 44 slots, with each slot being ¼ of an inch wide and 5⅝ inches long. The resilient tube had a wall thickness of 3/16 of an inch. With respect to the holes 53, 22 were drilled in the periphery of the barrier, with each hole having a diameter of 0.209.

It should be understood that one need not adhere to the precise dimensions given in the foregoing examples. In general the flow area afforded by the openings 53 must be a minor fraction of the flow area afforded by the annular orifice about the barrier for full open position of the valve. Thus in the foregoing examples the ratio between the aggregate cross-sectional flow area afforded by openings 53, and the flow area afforded about the barrier for full open position for the valve, is of the order of 1 to 35.

In addition to eliminating or minimizing chattering at low pressures, it has been found that the arrangement described makes possible a somewhat greater latitude in proportioning the clearance about the barrier, particularly for valves of the larger sizes ranging from 6 inches and up. More specifically the clearance about the barrier can safely be made somewhat greater without chattering for the higher pressures, than would be possible without the openings 53. It should be understood however that relatively large ratios between clearance and barrier diameter of the order of 1 to 10 will result in chattering irrespective of openings 53. In the present invention ratios of the order of 1 to 16 can be used but the preferred proportioning employs ratios of the order of 1 to 20 to 1 to 22.

In the embodiment of Figure 13 a plurality of circumferentially spaced grooves 53a are provided in place of the holes 53. These grooves are proportioned to afford restricted passages corresponding in flow capacity to the holes 53, and are closed off by the expansible tube in substantially the same manner as previously described.

I claim:

1. In a flow control device, a body having inflow and outflow passages for flow of fluid, a tube of resilient material disposed within the body and having its ends sealed with respect to the body about the passages, a circularly contoured barrier disposed within the tube intermediate the ends of the same, the barrier having an annular peripheral surface of substantial width against which the adjacent annular portion of the tube is adapted to engage and seal, and grids disposed within the end portions of the tube on opposite sides of the barrier to prevent inward collapsing of the tube, means forming a closed annular fluid chamber about the tube, there being a duct communicating with the chamber for applying a controlling fluid under pressure to the same, the barrier being provided with restricted passages for flow of fluid, said passages communicating with the region about the periphery of the barrier at points spaced intermediate the inflow and outflow edges of the same, and also communicating with the outflow passage.

2. In a flow control device, a body having passages for flow of fluid, a tube of resilient material disposed within the body and having its ends sealed with respect to the body about the passages, a circularly contoured barrier disposed within the tube intermediate the ends of the same and having a diameter greater than the diameter of the passages, said barrier providing an annular peripheral portion having an outer peripheral surface of substantial width against which the adjacent annular portion of the tube is adapted to engage and seal, grids disposed within the end portions of the tube on opposite sides of the barrier to prevent inward collapsing of the tube, the grid on the outflow side of the barrier affording a plurality of circumferentially spaced slots extending from the barrier for a substantial distance, means forming a closed annular fluid chamber about the tube, there being a duct communicating with the chamber for applying a controlling fluid under pressure, and restricted passages in said annular portion serving to establish communication between the outflow passages and the region immediately surrounding the periphery of the barrier at points intermediate the inflow and outflow edges of the same.

3. In a flow control device, a body having inflow and outflow passages for flow of fluid, a tube of relatively resilient material disposed within the body and having its ends sealed with respect to the body about the passages, a circularly contoured barrier disposed within the sleeve intermediate the ends of the same, the barrier having an annular peripheral portion having a peripheral surface of substantial width against which the adjacent annular portion of the tube is adapted to engage and seal, grid means disposed within the end portions of the tube on opposite sides of the barrier to prevent inward collapsing of the tube, means forming a closed annular fluid chamber about the tube, there being a duct communicating with the chamber for applying a controlling fluid under pressure whereby the tube can be caused to either seal upon the periphery of the barrier or can be permitted to expand to permit flow of fluid between said passages and through an annular orifice about the periphery of the barrier, said last means including an annular abutment wall surrounding the tube in the region of the barrier, the clearance between the outer surface of the tube and said abutment wall, when the tube is engaged with the periphery of the barrier, being of the order of from about $\frac{1}{8}$ to $\frac{1}{22}$ of the diameter of the barrier, and restricted flow passages formed in said annular portion of the barrier, said passages communicating between the outflow passage and the region immediately surrounding the peripheral surface of the barrier at points located intermediate the inflow and outflow end edges of the barrier, said last named passages affording an aggregate cross-sectional flow area which is a minor fraction of the cross-sectional flow area afforded by said clearance.

4. In a flow control device, a body having inflow and outflow passages for flow of liquid, a tube of resilient material disposed within the body and having its ends sealed with respect to the body about the passages, a circularly contoured barrier disposed within the sleeve intermediate the ends of the same, the barrier having an outer annular portion affording a peripheral surface of substantial width against which the adjacent annular portion of the tube is adapted to engage and seal, grid means disposed within the end portions of the tube on opposite sides of the barrier to prevent inward collapsing of the tube, and a plurality of small circumferentially spaced holes formed in said annular portion of the barrier, the inner ends of said holes communicating with the outflow passage and the outer ends of said holes communicating with the region surrounding the outer periphery of the barrier at points intermediate the inflow and outflow edges of the barrier.

5. In a flow control device, a body having inflow and outflow passages for flow of fluid, a body of resilient material disposed within the body and having its ends sealed with respect to the body about the passages, a circularly contoured barrier disposed within the sleeve intermediate the ends of the same, the barrier having an outer annular portion affording a peripheral surface of substantial width against which the adjacent annular portion of the tube is adapted to engage and seal, grid means disposed within the end portions of the tube on opposite sides of the barrier to prevent inward collapsing of the tube, said grid means including spaced ribs separated by circumferentially spaced elongated slots, means forming a closed annular fluid chamber about the tube, there being a duct communicating with the chamber for applying a controlling fluid under pressure whereby the tube can be caused to either seal upon the periphery of the barrier or can be permitted to expand to permit flow of fluid between said passages and through an annular orifice about the periphery of the barrier, said last means including an annular abutment wall surrounding the tube in the region of the barrier, the clearance between the outer surface of the tube and said abutment wall, when the tube is engaged with the periphery of the barrier, being of the order of from about $\frac{1}{8}$ to $\frac{1}{20}$ of the diameter of the barrier, and a plurality of circumferentially spaced holes in said annular portion of the barrier, the inner ends of said holes communicating with said outflow passage and the outer ends of said holes communicating with the region immediately surrounding the barrier at points intermediate the inflow and outflow edges of the barrier, the aggregate cross-sectional area afforded by said holes being a minor fraction of the cross-sectional flow area afforded by said clearance.

DOUGLAS H. ANNIN.